April 14, 1964 W. M. McCONNELL 3,128,482

METHOD OF SUPPORTING AND ROTATING PIPE FOR THREADING OPERATION

Filed March 30, 1960 10 Sheets-Sheet 1

Fig. I

INVENTOR.
William Mynard McConnell

BY Webb, Mackey & Burden

HIS ATTORNEYS

April 14, 1964 W. M. McCONNELL 3,128,482

METHOD OF SUPPORTING AND ROTATING PIPE FOR THREADING OPERATION

Filed March 30, 1960 10 Sheets-Sheet 2

INVENTOR.
William Mynard McConnell

BY Webb, Mackey & Burden

HIS ATTORNEYS

April 14, 1964 W. M. McCONNELL 3,128,482

METHOD OF SUPPORTING AND ROTATING PIPE FOR THREADING OPERATION

Filed March 30, 1960 10 Sheets-Sheet 3

INVENTOR.
William Mynard McConnell
BY Webb, Mackey & Burden
HIS ATTORNEYS

April 14, 1964 W. M. McCONNELL 3,128,482

METHOD OF SUPPORTING AND ROTATING PIPE FOR THREADING OPERATION

Filed March 30, 1960 10 Sheets-Sheet 4

INVENTOR.
William Mynard McConnell
BY Webb, Mackey & Burden
HIS ATTORNEYS

METHOD OF SUPPORTING AND ROTATING PIPE FOR THREADING OPERATION

Filed March 30, 1960 10 Sheets-Sheet 5

INVENTOR.
William Mynard McConnell
BY Webb, Mackey & Burden
HIS ATTORNEYS

April 14, 1964 W. M. McCONNELL 3,128,482

METHOD OF SUPPORTING AND ROTATING PIPE FOR THREADING OPERATION

Filed March 30, 1960 10 Sheets-Sheet 6

INVENTOR.
*William Mynard McConnell*

BY *Webb, Mackey & Burden*

*HIS ATTORNEYS*

INVENTOR.
William Mynard McConnell
BY Webb, Mackay + Burden
HIS ATTORNEYS

INVENTOR.
William Mynard McConnell
BY Webb, Mackey & Burden
HIS ATTORNEYS

METHOD OF SUPPORTING AND ROTATING PIPE FOR THREADING OPERATION

Filed March 30, 1960 10 Sheets-Sheet 9

INVENTOR.
William Mynard McConnell
BY Webb, Mackey & Burden
HIS ATTORNEYS

April 14, 1964 W. M. McCONNELL 3,128,482

METHOD OF SUPPORTING AND ROTATING PIPE FOR THREADING OPERATION

Filed March 30, 1960 10 Sheets-Sheet 10

INVENTOR.
William Mynard McConnell
BY Webb, Mackey & Burden
HIS ATTORNEYS

United States Patent Office 3,128,482
Patented Apr. 14, 1964

3,128,482

METHOD OF SUPPORTING AND ROTATING PIPE FOR THREADING OPERATION

William Mynard McConnell, Pittsburgh, Pa., assignor to Taylor-Wilson Manufacturing Co., Pittsburgh, Pa., a corporation of Pennsylvania Filed Mar. 30, 1960, Ser. No. 18,578
4 Claims. (Cl. 10—1)

This invention relates to pipe threading machines and methods and particularly to machines and methods which impart taper and threads to ends of pipe and tubing used in oil well drilling operations, in pipe lines which convey petroleum products or gas over long distances and in chemical plants, etc.

In tapering and threading ends of large diameter and long length pipe, support of the pipe along its length during tapering and threading operations and particularly adjacent the end which is to be tapered and threaded presents serious problems. Usually the pipe to be tapered and threaded is ovalled and, accordingly, the end to be threaded must be firmly and securely supported when presenting it to a tool or tools which taper and thread. However, the end of the pipe including that part immediately adjacent thereto must not be gripped by an excessive pressure which temporarily rounds the ovalled end during threading so that when the excessive pressure is released after the threading operation, the end returns to its ovalled shape and the threads imparted to the end are out of round. An end of a length of pipe with its threads out of round does not properly receive or accommodate a coupling, thereby preventing satisfactory connection with another length of pipe and subjecting the length to rejection. Even though an end of a length of pipe is ovalled, if its threads are round, the end satisfactorily receives a coupling, and the length may then be used as a part of a pipe line or a drilling shaft on an oil well rig.

Some lengths of pipe have longitudinal bow or camber which causes the end to be threaded to whip around when the pipe is rotated about its longitudinal axis. Whipping of the end makes threading and tapering difficult and also subjects the tools for tapering and threading to damage and/or excessive wear. Accordingly, positioning and supporting of the end during tapering and threading operations avoids damage to and excessive wear of the tools.

Efficient, easy and fast attachment of couplings to a pipe and of lengths of pipe to each other is hindered by lack of uniformity in taper of the ends of the pipe and/or in lack of uniformity in pitch of the threads. Many pipe threading machines use a combination of chasers disposed in a housing or other similar device to impart both taper and threading to the end of the pipe. To obtain a specified amount of taper, a user positions each chaser relative to the others so that the required amount of taper results. In other words, the user must adjust carefully the position of each chaser relative to the longitudinal axis of its housing or support so that the required degree of taper results when the end of the pipe is subjected to the chaser combination. Some adjustments of the chasers to produce the required degree of taper are in thousandths of an inch and, consequently, accurate positioning of the chasers is a difficult and time-consuming operation accompanied at times by guess work on the part of the operator of the threading machine. As a result, amounts of taper produced are not uniform and do not meet specification.

Some pipe threading machines heretofore in use required a change in their gear drive whenever pitch in the threads is increased or decreased. As a result, these machines were subject to substantial down-time for the change in the gear drive and, in some instances, required a special maintenance crew.

My invention in pipe threading machines supports a length of pipe so that ovalling of the end to be threaded is avoided while firmly and securely supporting the pipe along its length and particularly adjacent the end to be tapered and/or threaded. Also, my invention has ability to support and to maintain in a given position a length of cambered or bowed pipe so that the end to be tapered or threaded does not whip during the tapering and threading operation. In addition, my invention does not round an ovalled end and imparts to the end uniform taper and uniform pitch in the threads on a single machine.

Specifically, my invention comprises in a pipe threading machine having a frame, the combination including a rotatable sleeve or barrel mounted on the frame and connected to a source of power for rotating it about its longitudinal axis. The sleeve receives a length of pipe including an end which is to be threaded with the end extending a short distance out through one end of the sleeve. A primary chuck carried by the sleeve and rotatable therewith is located on the sleeve adjacent the end opposite that through which the end of the pipe extends. This primary chuck has movable jaws with biting edges which firmly grip the pipe about its periphery.

Adjacent the end of the sleeve through which the end of the pipe extends and mounted upon the sleeve is a steady rest or secondary chuck which is also rotatable with the sleeve. This steady rest chuck has movable jaws which engage and are shaped to fit around at least a part of the periphery of the pipe but do not bite into it.

The primary chuck has means for moving its jaws into engagement with the pipe and the steady rest chuck has connected thereto through linkage a means such as a lock valve cylinder for providing a fluid pressure backing for its jaws and for moving its jaws into and out of engagement with the pipe. The lock valve cylinder may also provide a hydraulic lock (to be described herein) for the jaws of the steady rest chuck whereby the jaws maintain the pipe in a given position by resisting movement of the pipe out of the given position without application of pressure upon the pipe.

Mounted upon the frame of the machine for controlled movement thereon is a carriage which advances along a path of travel parallel to the longitudinal axis of the sleeve. The carriage mounts at least one tool holder which carries a stationary tool for engaging the end of the pipe to impart taper and/or threads thereto. The tool holder is movable on the carriage toward and away from the periphery of the pipe along a path of travel substantially transverse to that of the carriage.

Connected to the carriage is a motor means such as a hydraulic cylinder for advancing it along the frame to bring the tool into engagement with the end of the pipe.

A guide means is connected to the frame and positioned thereon to be engaged by a guide element of the tool holder as the carriage moves along its path of travel. The guide means and the guide element control movement of the tool holder along its path of travel on the carriage and thereby governs the amount of taper imparted to the pipe. To insure that the tool properly engages the end a means is disposed on the carriage and connected to the tool holder to urge the tool into and to maintain it in engagement with the pipe.

Drivingly connected to the rotatable sleeve is a control means positioned to engage a part of the carriage. This control means regulates travel of the carriage along its path of travel on the frame whereby the travel of the carriage is related to revolutions of the sleeve and of the pipe received therein during threading to produce a desired pitch in the threads. The control means may be a cam mounted upon a shaft which is drivingly connected to the sleeve.

On the machine tapering of the end of the pipe is performed independently of threading and is substantially, if not fully, completed when threading is begun. A metered feed of hydraulic fluid to the hydraulic cylinder regulates travel of the carriage along the frame for the tapering operation. Then, just before the carriage engages the cam, feed of the hydraulic fluid to the cylinder is increased to insure that the part of the carriage remains in engagement with the cam throughout the threading operation.

The guide means connected to the frame of the pipe threading machine comprises a bar pivotally mounted at a point intermediate its ends for movement of the bar about its pivot mounting to bring the bars to an adjustment position in order to produce a given amount of taper on the end of the pipe. The bar has a guide surface which is engaged by the guide element of the tool holder as the carriage moves along its path of travel. This guide means has two members positioned relative thereto so that one member engages the bar between its pivot mounting and an end thereof and so that the other member engages the bar between the pivot mounting and its other end. The two members are movable to place the bar in the adjustment position about its pivot mounting and each member has a tapered surface which engages the bar whereby movement of the members relative to the bar pivots the bar about its mounting. To bring the bar into the adjustment position, I provide a means connected to the two members for moving them.

In the accompanying drawings I have shown a preferred embodiment of my invention in which.

Figure 1:
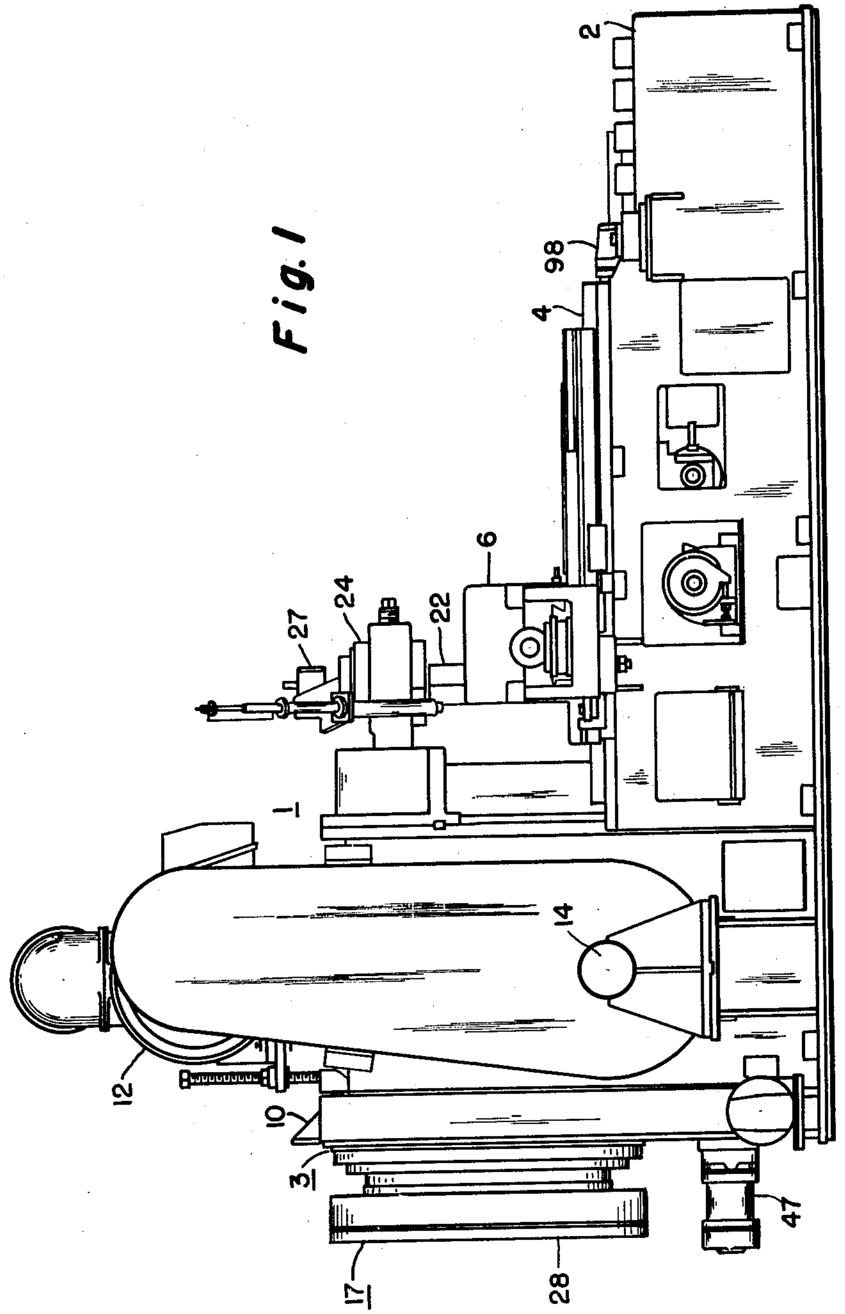
FIGURE 1 is a side elevation view of a pipe threader embodying my invention.
Figure 2:
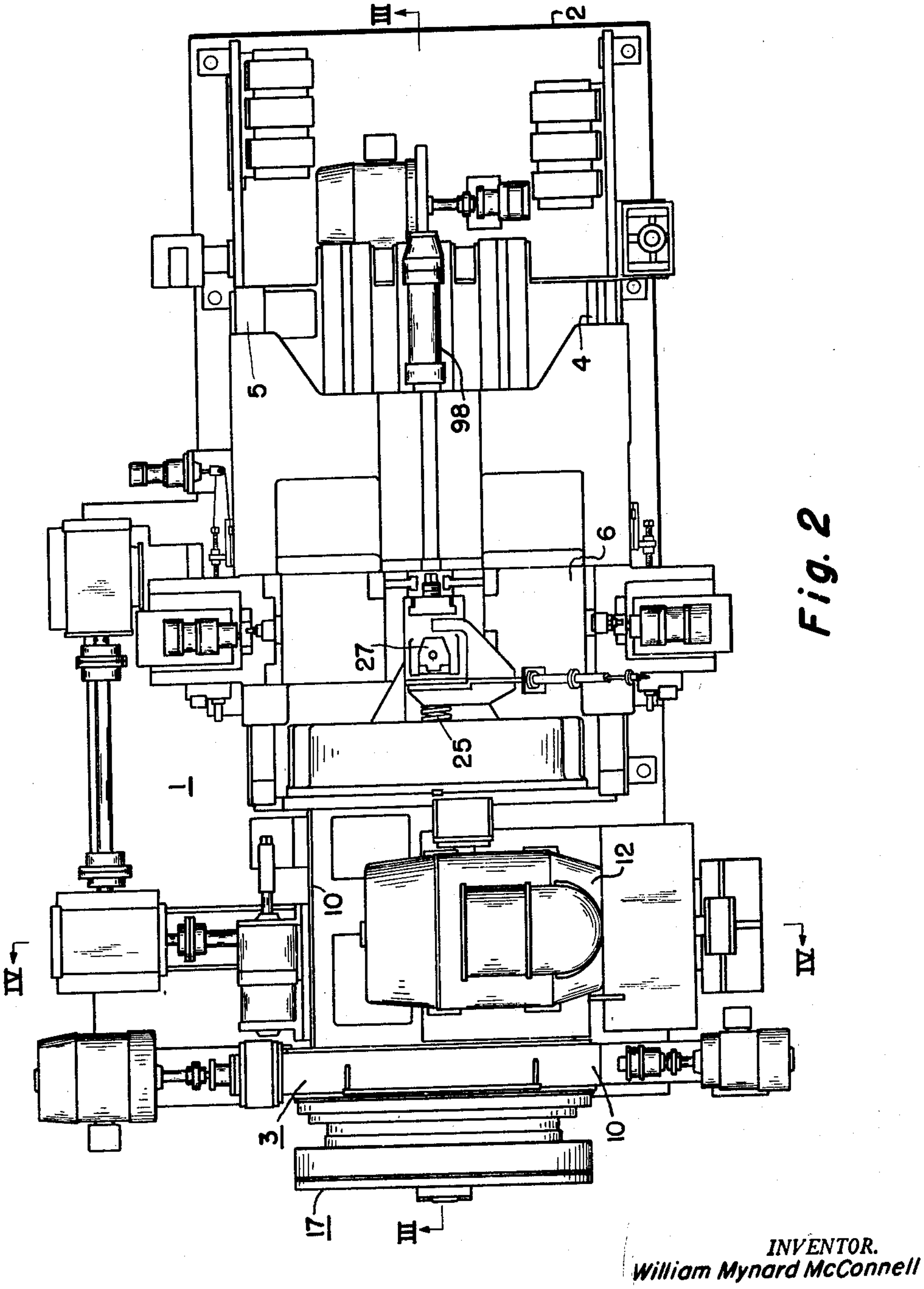
FIGURE 2 is a plan view of the pipe threader of FIGURE 1.
Figure 3:
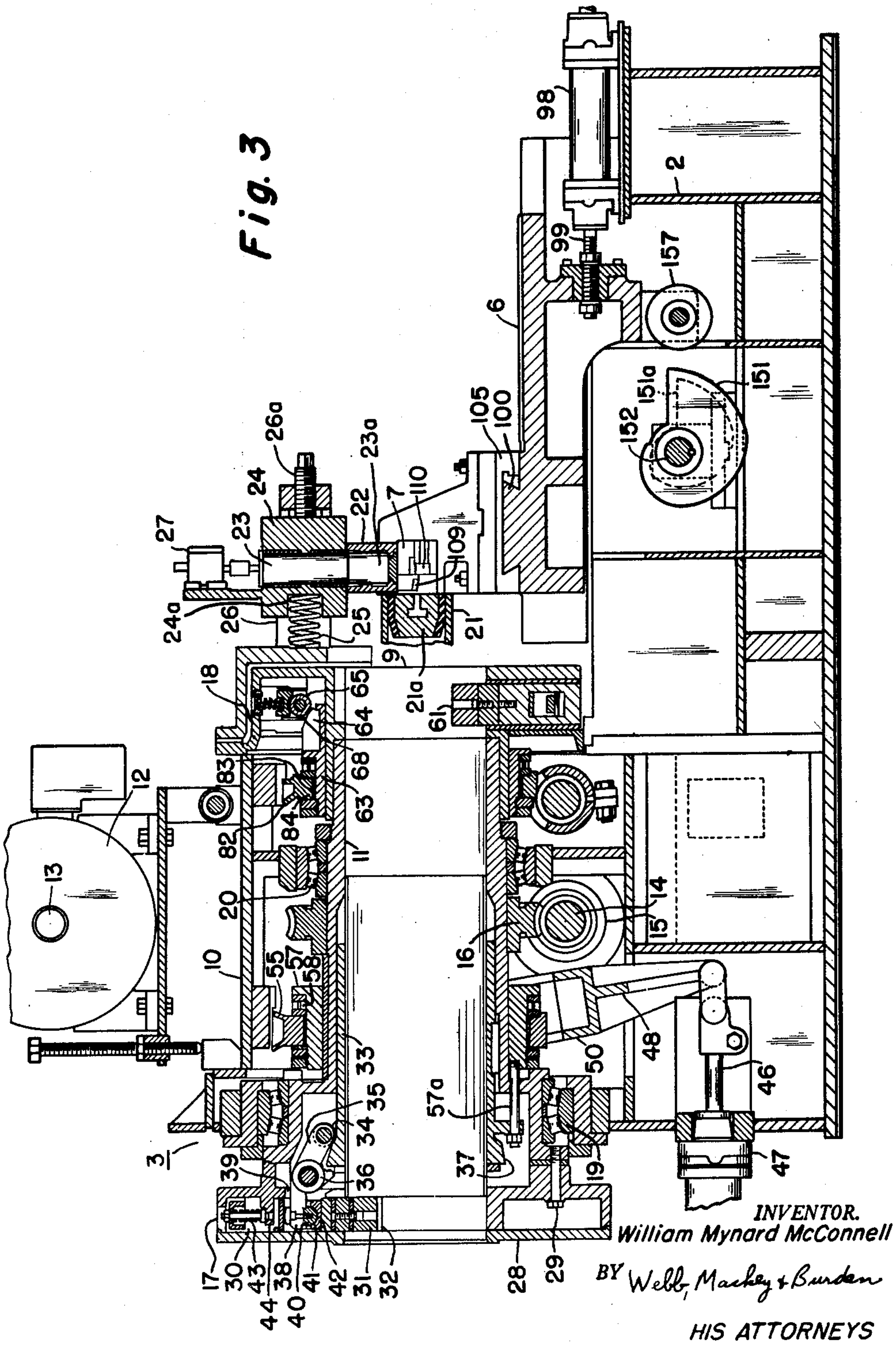
FIGURE 3 is a section view along the line III—III of FIGURE 2.
Figure 4:
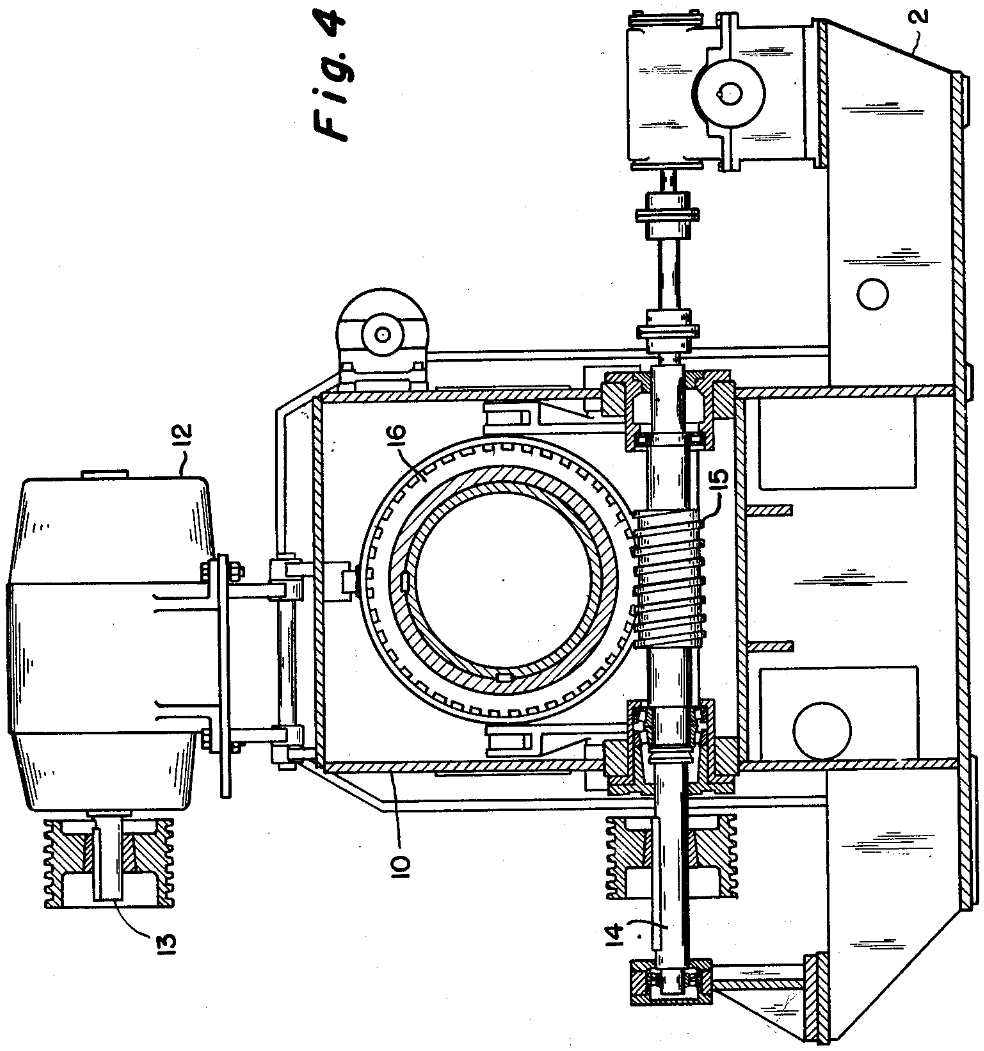
FIGURE 4 is a section view along the line IV—IV of FIGURE 2.

FIGURES 1–3 inclusive and 10 show a pipe threader 1 comprising a frame 2 which mounts a pipe receiver 3 for accommodating and supporting a part of a length of pipe including an end to be tapered and threaded. Disposed for travel on ways 4 and 5 of the frame 1 and located to the right of the pipe receiver viewing FIGURES 1 and 3 is a carriage 6 supporting two tool holders 7 and 8 each of which mounts a tool for tapering the end of the pipe and a chaser for imparting threads thereto. The carriage is positioned on the frame to bring the tools and chasers into engagement with the end of a length of pipe disposed in the pipe receiver 3 which end extends a short distance out through the end 9 of the receiver 3.

Referring to FIGURES 1, 3, 4 and 14, the pipe receiver comprises a housing 10 which mounts therein a rotatable barrel 11 driven by a threader motor 12 positioned atop the threader. A shaft 13 of the motor is connected to a drive shaft 14 disposed transversely to and beneath the barrel 11 with the drive shaft mounting a first worm 15 which meshes with a gear 16 carried by the barrel 11. Belts (not shown) connect the motor shaft 13 to the drive shaft 14 and thereby transmit rotating power to the drive shaft for rotating the barrel 11.

Affixed to the left-hand end of the barrel 11 viewing FIGURE 3 and rotatable therewith is a primary chuck 17 and affixed to the right-hand end of the barrel and also rotatable therewith is a secondary or steady rest chuck 18. In FIGURE 3 both chucks are in open position. As shown, the barrel 11 rotates upon roller bearings 19 and 20 carried by the housing 10.

The barrel receives and accommodates part of a length of pipe 21 including the end to be threaded and tapered which extends out through the steady rest chuck and engages a pipe stop 22. The pipe stop is a roller sleeve carried by and fitting around an eccentric member 23*a* connected to the lower end of a rotatable, vertically disposed spindle 23 which is mounted in a block 24. A slide 26 connected to the housing 10 supports the block 24 which is disposed between an adjusting screw 26*a* at one end of the slide and a coil spring 25 positioned between the housing 10 and the block 24. One end of the spring 25 engages the housing 10 and the other end extends into a recess 24*a* of the block and there engages it. The spring 25 is under compression and urges and maintains the block 24 in engagement with one end of the adjusting screw 26*a*.

The adjusting screw 26*a* positions the pipe stop 22 along the slide 26 to obtain a desired length of threading on the end of the pipe 21. Thus, operation of the adjusting screw 26*a* moves the pipe stop toward or away from the end of the housing 10 to a given position for production of a desired length of threading.

The adjusting screw 26*a* has the same number of threads per inch as a first screw adjustable cam 170 (to be described hereinafter and shown in FIGURE 15) which actuates a limit switch 171 (also to be described hereinafter) for initiating a controlled rate of travel of the carriage 6 during the threading operation. In combination with the first screw adjustable cam 170 is a second screw adjustable cam 172 which engages a limit switch 173 to terminate the threading operation. Accordingly, by turning the adjusting screw 26*a* to position the pipe stop 22 the same number of turns from a zero point as the first screw adjustable cam from its zero point to determine commencement of the controlled rate of travel of the carriage during threading and by setting the second cam 172, specified lengths of threading on the end of the pipe are easily obtained. Of course, the zero points have a common location on their respective cam or screw.

The pipe stop 22 is mounted upon roller bearings (not shown) carried by the eccentric member 23*a* so that when the end of the pipe contacts the stop, the stop may turn upon its roller bearings about its central axis as the pipe rotates about its longitudinal axis at a base speed. After the end of the pipe has been securely gripped by the two chucks and after the end of the pipe has engaged the stop 22, the motor 27 rotates the spindle 23 and the eccentric member 23*a* about 180° to take the roller out of engagement with the end of the pipe and to provide a clearance for the revolving pipe during the tapering and threading operations.

The stop 22 functions as an electrical conductor and upon engagement by the end of the pipe therewith, transmits an electrical signal to a control system (not shown) indicating that the pipe is positioned in the pipe receiver and that tapering and threading operations may commence.

As shown in FIGURE 3, the primary chuck comprises a chuck body 28 connected to the barrel 11 by bolts 29 so that the primary chuck rotates with the barrel. Movably disposed in cavities 30 of the body are five jaws of which jaw 31 is representative and a description thereof is equally applicable to the other four jaws (not shown). Jaw 31 has a gripping or biting edge 32 which bites into the periphery of the pipe and firmly holds the pipe so that it rotates with the barrel. The primary chuck is designed to exert pressures up to 90,000 pounds on the pipe.

Closing of the primary chuck 17 and movement of the jaw 31 into engagement with the pipe results from travel of a first shifter sleeve 33 to the right, viewing FIGURE 3, whereupon a roller 34 carried at one end of arm 35 of a bell crank lever 36 rides up an inclined shoulder 37 of the first shifter sleeve 33. Travel of the roller 34 up the shoulder 37 swings the bell crank lever 36 counterclockwise, viewing FIGURE 3, causing its other arm 38 to move the jaw 31 into biting engagement with the pipe. The arm 38 extends through an opening 39 in the casing 28 and carries at its outer end a ball 40 which seats in a socket 41 of the body 42 of the jaw.

A coil spring 43 seated upon a projection 44 of the casing 28 engages the body of the jaw and urges it radially away from the pipe. Closing of the chuck overcomes the force exerted by the coil spring 43 to maintain the jaw out of engagement with the pipe. The spring returns the jaw 31 to open position and out of engagement with the pipe when the first shifter sleeve 33 moves into the position shown in FIGURE 3 where the chuck 17 is shown in open position.

The chuck 17 opens when the first shifter sleeve 33 moves to the left, viewing FIGURE 3, thus allowing the spring 43 to withdraw the jaw 31 from engagement with the pipe and swing the bell crank lever 36 clockwise, viewing FIGURE 3, whereby the roller 34 rides down the inclined shoulder 37.

The first shifter sleeve 33 simultaneously operates four other bell crank levers (not shown) the same as the bell crank lever 36 to open and close the other four jaws of the primary chuck 17 in the same way as described in regard to the jaw 31.

Figure 6:
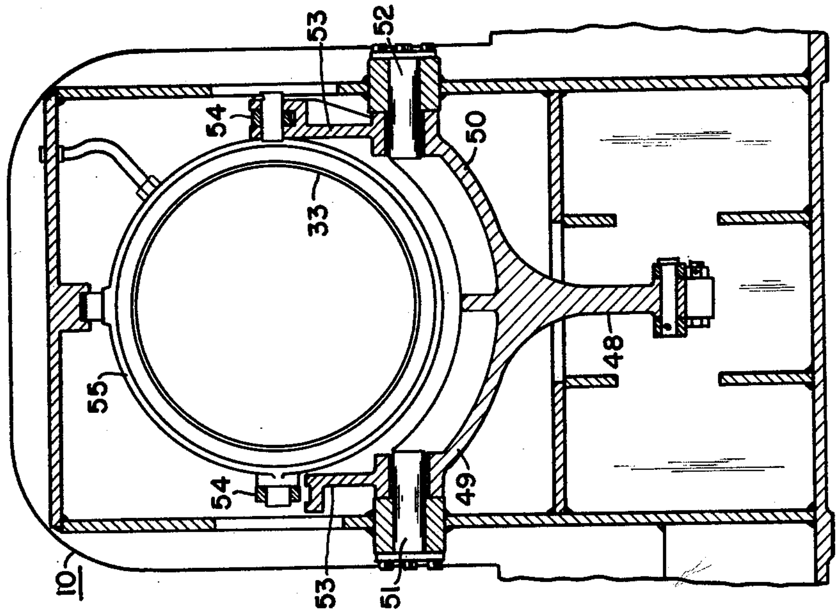
FIGURE 6 is a section view along the line VI—VI of FIGURE 5.
Figure 5:
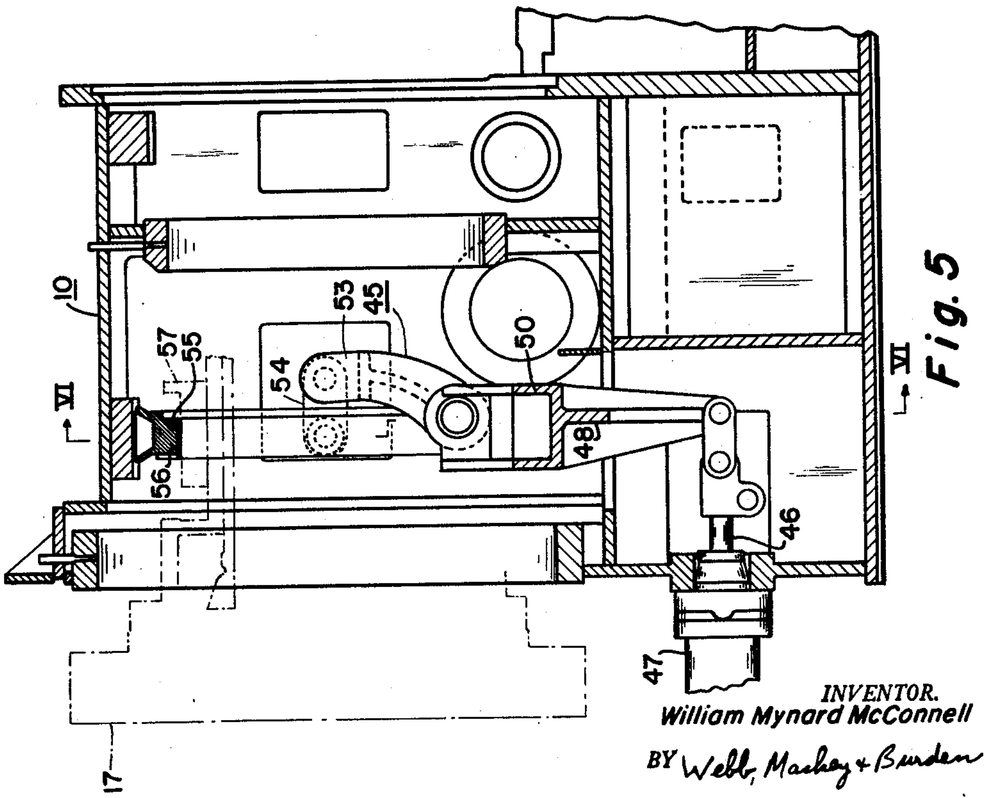
FIGURE 5 is a side elevation view partly in section showing a shifter mechanism of a primary chuck of the threader of FIGURE 1.

FIGURES 3, 5 and 6 show a linkage 45 by which a primary cylinder motor 47 operates the first shifter sleeve 33 to open and close the primary chuck 17. A rod 46 connects the primary cylinder motor 47 to a yoke 48 whose arms 49 and 50 are connected to pivot pins 51 and 52 respectively, each pin being rotatably disposed in the housing 10. Also connected to each pivot pin is one end of a shifter lever 53 whose other end is joined to a connecting link 54. The connecting link 54, in turn, engages a first shifter ring 55 which is received by a bushing 56 of a first block 57 affixed to the first shifter sleeve 33 by bolts such as bolt 57*a*. In addition to the bushing 56 there are bearings 58 disposed between the first shifter ring 55 and the block 57 whereby the block and the first shifter sleeve are rotatable with the barrel 11 while the first shifter ring 55 remains stationary.

To close the primary chuck 17, the primary cylinder motor 47 moves the rod 46 to the left, viewing FIGURES 3 and 5, thus causing the arms 49 and 50 of the yoke 48 to move to the left and pivot the lever 53 to the right. Then, the first shifter ring 55 travels to the right, viewing FIGURE 3. Travel of the first shifter ring to the right slides the first shifter sleeve 33 to the right relative to the barrel 11 and causes the roller 34 to ride up the inclined shoulder 37 of the first shifter sleeve to force the jaw 31 radially inwardly to engage and grip the pipe.

To open the chuck 17, the primary cylinder motor forces the rod 46 to the right, viewing FIGURES 3 and 5, causing the arms of the yoke 48 to move to the right and pivot the lever 53 to the left whereupon the first shifter ring 55 travels to the left, viewing FIGURE 3. Travel of the first shifter ring to the left forces the first shifter sleeve 33 to slide to the left relative to the barrel 11, thus permitting the coil spring 43 to raise the jaw 31 from the pipe and simultaneously swing the bell crank lever 36 clockwise. The roller 34 then rides down the inclined shoulder 37 of the first shifter sleeve 33 to the position shown in FIGURE 3.

Figure 9:
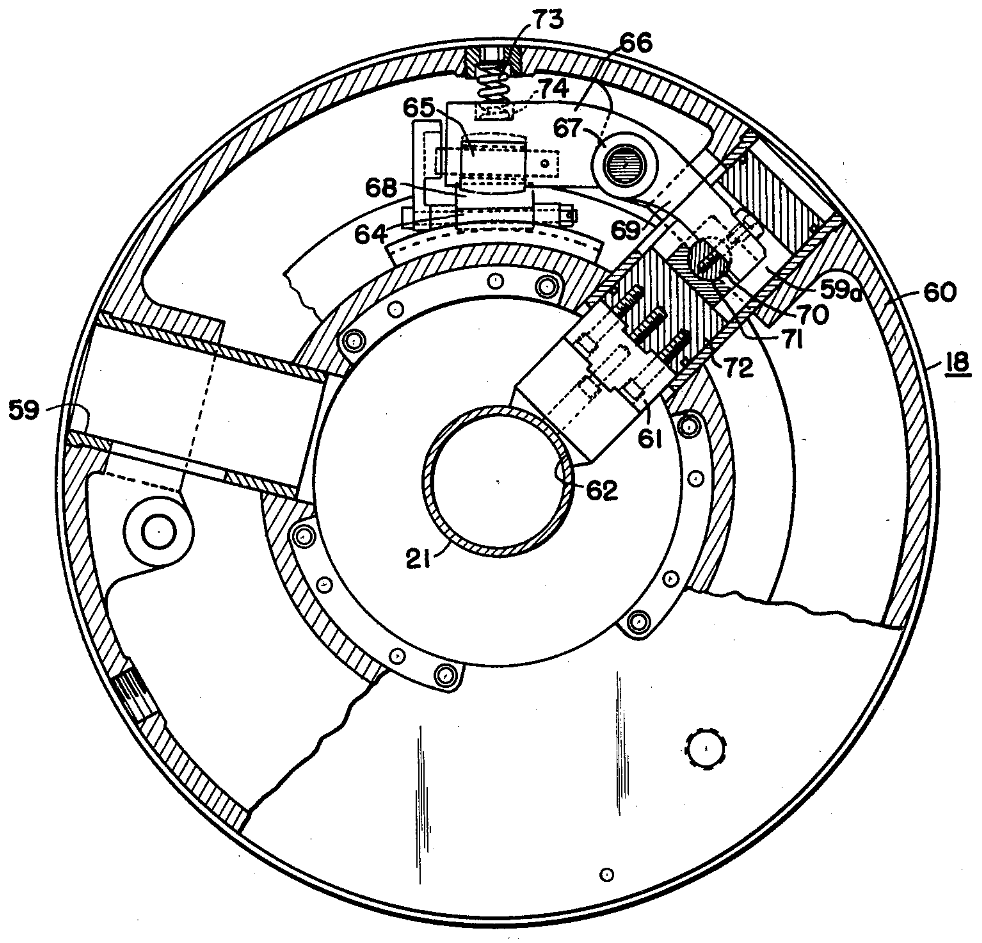
FIGURE 9 is a cross section view of the steady rest chuck.

As shown in FIGURES 3 and 9, the secondary or steady rest chuck 18 comprises three jaws (one shown in detail and the other two not shown, FIGURE 9) movably disposed in cavities 59 in a chuck housing 60. Jaw 61 (shown in detail in FIGURE 9) is representative of the other two jaws and a description thereof is equally applicable to the other two jaws. The jaw 61 has a concave working surface 62 which engages and fits around a part of the periphery of the pipe and does not bite into the periphery of the pipe like the jaw 31 of the primary chuck 17.

The working surface 62 of the jaw 61 supports the pipe adjacent the end which is to be threaded and avoids rounding the end while simultaneously maintaining it in a given position for tapering and threading operations as will be described herein.

FIGURE 3 showns the steady rest chuck 18 in open position and FIGURE 9 shows it in closed position with the jaw engaging a length of pipe. To bring the jaws into closed position, a second shifter sleeve 63 travels to the right, viewing FIGURE 3, and moves a shoulder block 64 carried by the second shifter sleeve to the right so that a roller 65 mounted at one end of one arm 66 of a second bell crank lever 67 rides up an inclined shoulder 68 of the block 64. The bell crank lever 67, which is disposed perpendicularly to the sleeve 63, then rotates clockwise, viewing FIGURE 9, as the roller 65 travels up the inclined shoulder and swings its other arm 69 to move the jaw 61 radially towards the pipe and into engagement therewith. A ball and socket combination connects the arm 69 to the jaw 61 with the arm 69 mounting a ball 70 disposed in a socket 71 of the body 72 of the jaw 61.

To open the steady rest chuck 18 the second shifter sleeve 63 is moved to the left, viewing FIGURE 3, so that the second bell crank lever 67 rotates counterclockwise and the roller 65 travels down the inclined shoulder 68 as the one arm 66 moves radially toward and the other arm 69 radially away from the pipe, viewing FIGURE 9. Since the arm 69 extends into a chamber 59*a* of jaw body 72 where the ball 70 is located in the socket 71 of the jaw body 72, movement of the arm 69 radially toward and away from the pipe moves the jaw 61 in accordance therewith.

A coil spring 73 has one end seated in the chuck housing 60 of the steady rest chuck and the other end disposed in a recess 74 in the end of the arm 66 which carries the roller 65. This spring urges the arm 66 downwardly and the roller 65 into engagement with the inclined shoulder 68 of the block 64, thereby assisting opening of the chuck upon travel of the second shifter ring to the left, viewing FIGURE 3. The coil spring 73 maintains the jaw 61 out of engagement with the pipe when the steady rest chuck is in the open position, shown in FIGURE 3.

The second shifter sleeve 63 simultaneously operates two other bell crank levers (not shown) the same as the second bell crank lever 67 to open and close the other two jaws of the steady rest chuck in the same way as described in regard to the jaw 61.

Figure 8:
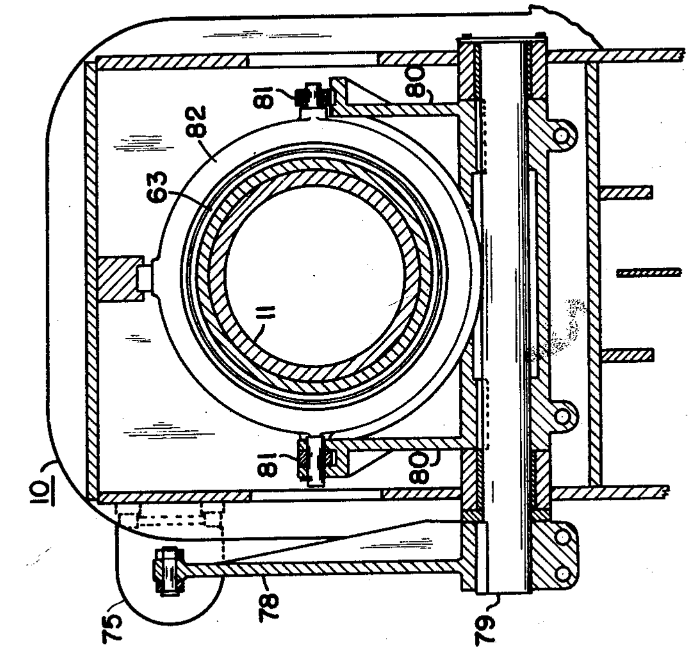
FIGURE 8 is a cross section view of the shifter mechanism of FIGURE 7.
Figure 7:
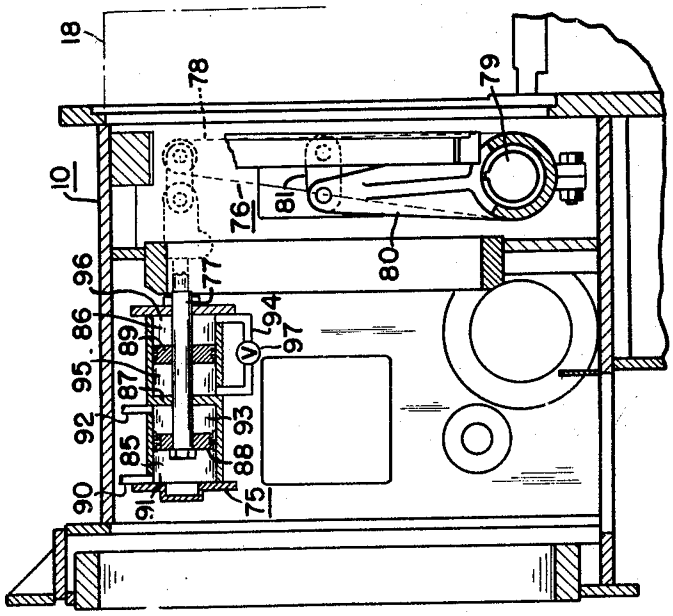
FIGURE 7 is a side elevation view partly in section of a shifter mechanism for a secondary or steady rest chuck of the threader of FIGURE 1.

Operation of the second shifter sleeve 63 is controlled by a conventional lock valve cylinder motor 75 affixed to one side of the housing 10 (FIGURES 7 and 8). The lock valve cylinder motor works through a linkage 76 connected to the second shifter sleeve 63 to open and close the steady rest chuck. A piston rod 77 of the cylinder 75 is joined to the upper end of a lever 78 whose lower end is keyed to a rotatable shaft 79 disposed within the housing and transversely beneath the barrel 11. Connected to the shaft 79 are two substantially vertical arms 80 straddling the barrel 11 and each extending upwardly to connect with a link member 81. Each link member is joined to a second shifter ring 82 received by a bushing 83 of a second block 84 integral with the second shifter sleeve 63.

To open the steady rest chuck 18, the lock valve cylinder motor forces the piston rod 77 to the right, viewing FIGURE 7, whereupon lever 78 turns the shaft 79 clockwise and causes vertical arms 80 to push the link members 81 to the right. Then the second shifter ring 82 travels to the right and slides the second shifter sleeve 63 to the right along the chuck housing 60 to operate the bell crank levers 67 and close the chuck 18.

Closing the steady rest chuck results from the piston rod 77 sliding to the left, viewing FIGURE 7, with the lever 78 turning the shaft 79 counterclockwise and causing the vertical arms 80 to push the link members to the left. Then the second shifter ring 82 rides to the left and slides the second shifter sleeve 63 to the left to close the chuck.

The lock valve cylinder 75 not only controls opening and closing of the steady rest chuck but also provides a hydraulic lock (to be more fully described hereinafter) for the jaws of the steady rest chuck once a pipe has been engaged thereby. Operation of lock valve cylinder 75 to close the jaws 61 produces pressures up to about 20,000 pounds upon the pipe, whereas the primary chuck generates gripping pressures up to about 90,000 pounds. In closing upon the pipe, the jaws 61 of the steady rest chuck center and position axially the end to be tapered and threaded so that the tapering and threading tools produce round taper and round threads on the end of the pipe. If the length of pipe has longitudinal bend or camber, the end opposite the end to be tapered and threaded will whip around during rotation of the pipe in the tapering and threading operations but the end to be tapered and threaded will be positioned and supported by the steady rest chuck in combination with the primary chuck so that it rotates about its longitudinal axis. Rotation of the end to be tapered and threaded about its longitudinal axis is important for production of round taper with round threads thereon. The pressure exerted by the steady rest chuck upon the pipe is enough to center and position the end to be tapered and threaded but insufficient to round ovalled pipe.

Once the end to be tapered and threaded has been positioned and centered by the jaws 61, the hydraulic lock takes over and maintains the jaws in the position where they have centered and positioned the end to be tapered and threaded. The hydraulic lock does not exert pressure upon the pipe but maintains the end centered in the steady rest chuck during tapering and threading operations and functions as a backing which resists radial movement of the end out of its centered position. Thus by use of the hydraulic lock, the end is not subjected to high gripping pressures and stresses and a round taper and round threads result despite presence of ovalling in the end to be tapered and threaded.

As shown in FIGURE 7, the lock valve cylinder 75 has two chambers 85 and 86 separated by a partition 87. A first piston 88 travels in the chamber 85 and a second piston 89 travels in the chamber 86 with the piston rod 77 extending into the cylinder and through the partition and mounting the two pistons 88 and 89. To close the steady rest chuck 18, I deliver air under pressure into the left part 91 of chamber 85 through a conduit 90 and thereby cause the rod 77 and pistons 88 and 89 to travel to the right, viewing FIGURE 7. During travel of the pistons 88 and 89 to the right, a conduit 92 permits escape of the air from part 93 of the chamber 85 on the right side of the piston. Correspondingly, in opening the chuck, air flows through conduit 92 to part 93 of the chamber 85 and forces the pistons 88 and 89 to the left, viewing FIGURE 7, whereupon air escapes from part 91 of the chamber 85 to the atmosphere.

A pipe 94 connects part 95 of the chamber 86 on the lefthand side of the piston 89 with part 96 of the chamber 86 on the righthand side of the piston 89 (viewing FIGURE 7) and hereby forms a closed system. Hydraulic fluid such as oil fills both parts 95 and 96 of the chamber 86 and the pipe 94 and flows from part 95 to part 96 or vice versa depending upon direction of travel of the piston 89. Connected into the pipe 94 is a valve 97 which when closed locks the volume of oil then present in both parts 95 and 96 of the chamber.

Closing of the valve 97 forms the hydraulic lock previously discussed herein. The valve 97 is closed after the jaws 61 have engaged the pipe whereby the oil is locked in both parts of the chamber 86. Air pressure in the chamber 85 may or may not be released following closure of the valve 97. With the valve 97 closed, the jaws 61 do not exert a pressure upon the pipe but maintain or hold it in position. Should the pipe attempt to move out of its position, the hydraulic lock, backing the jaws 61 through the linkage for opening and closing the jaws, resists any radial movement out of position.

When the steady rest chuck is to be opened, the valve 97 is first opened to permit the rod 77 to travel to the left, viewing FIGURE 7, when air under pressure is delivered into part 93 of the chamber 85.

Tapering and threading operations can be effected without the hydraulic lock by leaving the valve 97 open after the jaws 61 have engaged and closed upon the end to be tapered and threaded. When the hydraulic lock is not utilized during the tapering and threading operations, the steady rest chuck exerts a pressure upon the end to be tapered and threaded substantially less than the pressure applied by the primary chuck. Generally, the pressure applied by the steady rest chuck to the pipe during tapering and threading without the hydraulic lock is up to about 20,000 pounds and is insufficient to round an ovalled end.

Figures 10, 15:
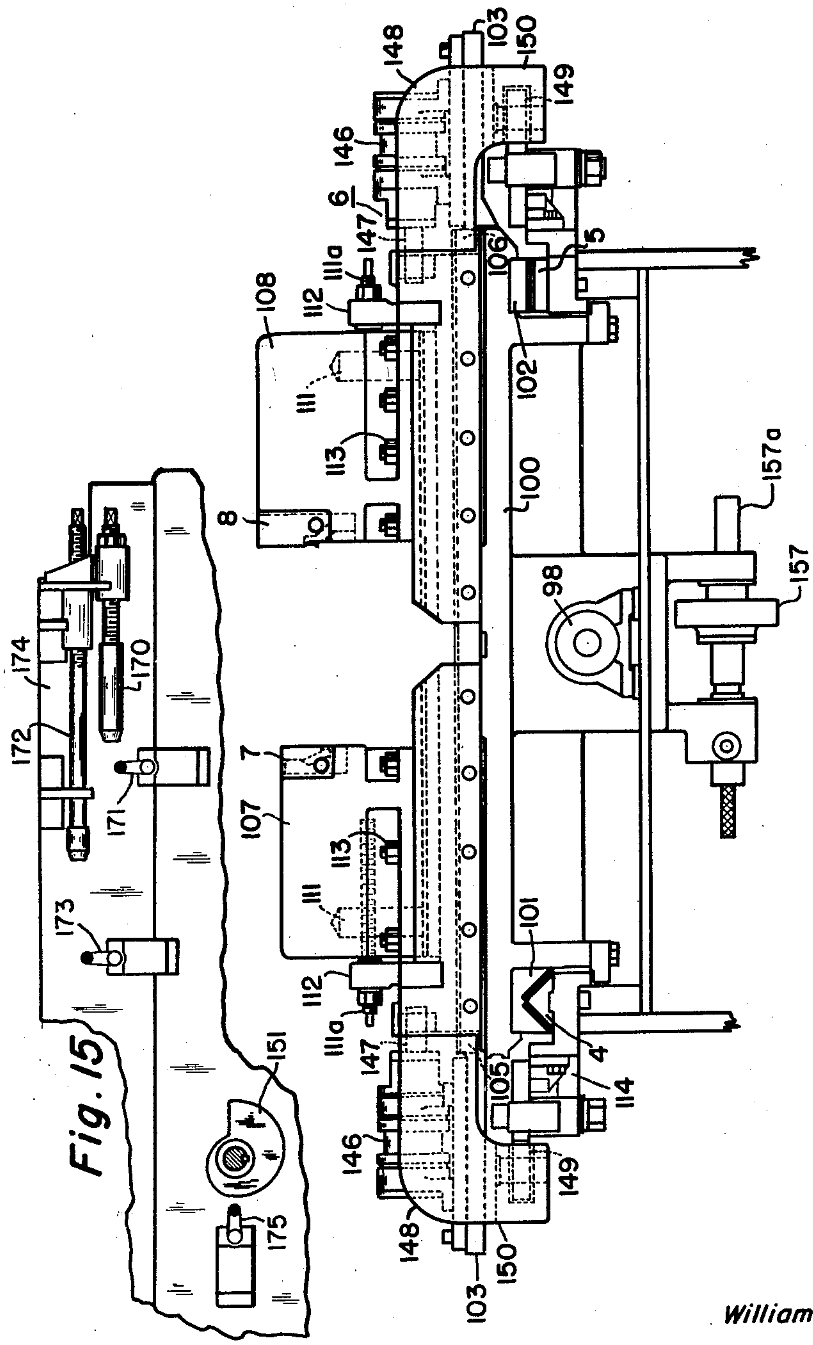
FIGURE 10 is an end elevation view of a carriage which mounts tool holders, tools and chasers of the threader of FIGURE 1.
FIGURE 15 is a partial side elevation view of components of a control combination for regulating travel of the carriage.

Referring to FIGURES 2, 3 and 10, the carriage 6 which mounts the tools for tapering the end of the pipe and the chasers for imparting thread to the pipe 21 moves longitudinally on the frame along a path of travel parallel to the longitudinal axis of the barrel 11. Movement of the carriage 6 on the frame is over the ways 4 and 5 to bring the tools into engagement with the pipe supported in the barrel 11. A carriage cylinder motor 98 affixed to the frame 2 supplies motivating power for advancing the carriage toward the pipe through connection of its piston rod 99 with the carriage 6.

The carriage 6 includes a cross slide way 100 extending transversely of the ways 4 and 5 as shown in FIGURES 3 and 10 and a pair of slide rails 101 and 102 affixed thereto for slidable engagement with and over the ways 4 and 5 respectively. The cross slide way is keystone shaped and slidably mounts a pair of tool platens 105 and 106. The tool platens travel toward and away from each other on the cross slide way 100 and straddle the pipe 21 supported by the barrel 11. On each tool platen is a tool block, block 107 on platen 105 and block 108 on platen 106, which is movable thereon along a path of travel parallel to that of its platen. The tool block 107 carries the tool holder 7 and the block 108 carries the tool holder 8. Each tool holder has a taper tool 109 for tapering the end of the pipe and a chaser 110 for imparting threads thereto with the chaser carried by tool holder 8 slightly advanced relative to the chaser mounted on tool holder 7.

A screw shaft 111*a* extends between a post 111 affixed to each tool block and an upright 112 of each tool platen. Rotation of the screw shaft brings the tool block and its tool holder into a given position for tapering and threading the end of a pipe of a particular diameter. Once the screw shaft has moved the tool block into the given position, bolts 113 lock the tool block at the given position upon the tool platen.

The tool blocks 107 and 108 are carefully positioned and aligned to insure accurate location of the taper tools and chasers relative to the pipe end to be tapered and threaded.

Referring to FIGURES 10–13 inclusive, affixed to the carriage 6 adjacent each way and located therealong is a sine bar bracket 114 which supports a sine bar 115 for guiding the taper tool and chaser while in engagement with the end of the pipe. The sine bar extends longitudinally in the direction of and along its way and is on the outside thereof. It has a tapered side 116 which determines the amount of taper produced on the end of the pipe by the taper tool 109 and chaser 110 as will be described hereinafter. The taper side 116 inclines outwardly away from its way in a direction toward the pipe receiver 3. A T-shaped pivot pin 117 extends through the midpart of the sine bar and mounts it upon the bracket 114 so that the bar may pivot about its mounting to permit adjustment of amounts of taper produced on the end of the pipe.

Adjacent each end of the sine bar and depending therefrom on a shaft 118 is a roller which engages a taper face of a wedge block. The shaft 118 has one end disposed in the sine bar and the other end receives a pin 119 whose ends are located in a horizontal segment 120 of a right angle support 121. Roller 122 carried adjacent one end of the sine bar engages wedge block 123 along its taper face 124 and roller 125 carried by the other end of the sine bar engages a wedge block 126 along its taper face 127. Bolts 128 affix the right angle support 121 to its end of the sine bar with each support having a slot 129 which receives an end of the sine bar and which is in the vertical segment 130 of the right angle support. Each right angle support carries a scribe mark 131 for aligning the sine bar with the center of the threader.

The wedge blocks are spaced apart and are located in a slot 132 of the bracket which slot runs parallel to the ways 4 and 5. As located in the slot, each wedge block is opposite and in engagement with its roller and has its taper face inclining away from the ends and towards the center part of the sine bar.

An alignment shaft 133 with right-hand threads 134 which engage the wedge block 126 and with left-hand threads 135 which engage the wedge block 123 extends between the two wedge blocks and positions them so that each roller engages a corresponding part of each taper face. In other words, each wedge block is so located along the alignment shaft that rollers 122 and 125 simultaneously engage corresponding parts of the taper faces 124 and 127; i.e., a center part midway between the ends of the taper faces. When the wedge blocks have been positioned along the alignment shaft, a lock nut 136 on one end of the shaft is tightened to prevent movement of the wedge blocks out of their respective positions.

An adjustment shaft 137 connected to end 138 of the wedge block 126 and supported along its length by a projection 139 of the bracket moves the two wedge blocks simultaneously along the slot toward or away from the end of the pipe to control amounts of taper imparted thereto. Lock nuts 140 and 141 on the shaft adjacent the projection and on opposite sides thereof permit securing the wedge blocks in a desired position by operating each lock nut until it engages the projection 139. On the adjustment shaft is a pointer 142 located opposite a scale 143 which indicates amounts of taper. By turning the adjustment shaft about its longitudinal axis to move the pointer along the scale, one can easily set the wedge blocks to produce a given amount of taper on the end of the pipe.

Figures 11, 12, 13:
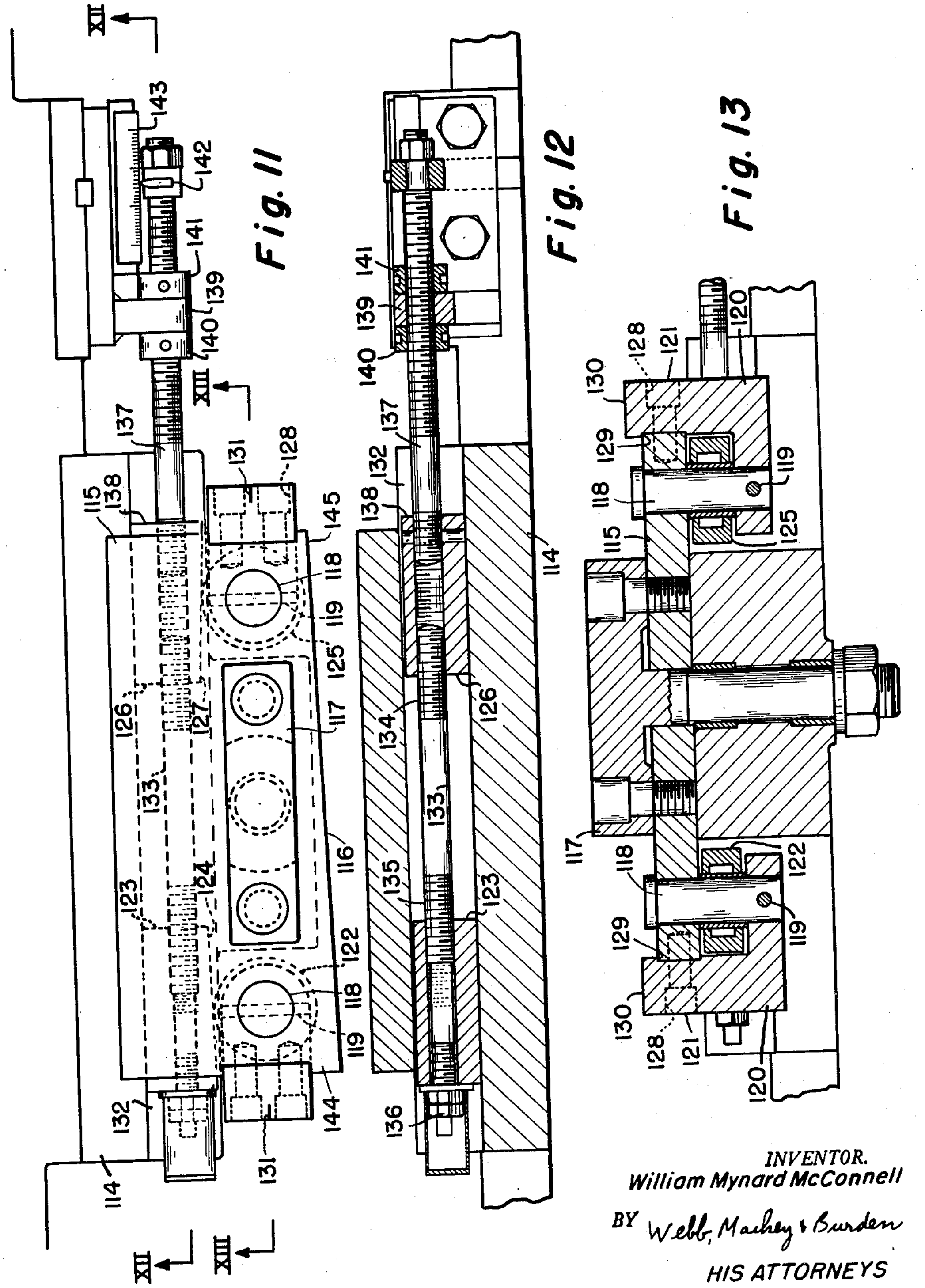
FIGURE 11 is a plan view of a sine or guide bar device of the threader of FIGURE 1.
FIGURE 12 is a section view along the line XII—XII of FIGURE 11.
FIGURE 13 is a section view along the line XIII—XIII of FIGURE 11.

To increase the amount of taper to be made on the end of the pipe, the adjustment shaft is turned in a direction to move the wedge blocks to the right, viewing FIGURE 11, or away from the end of the pipe. Movement of the wedge blocks to the right causes the taper face 124 of wedge block 123 to push end 144 of the sine bar in a counterclockwise direction (viewing FIGURE 11) and pivot the sine bar about its mounting in the bracket. Simultaneously, movement of the wedge block 126 to the right permits swinging of end 145 of the sine bar in a counterclockwise direction for taper face 127 inclines away from the roller 125, thus allowing pivoting of the sine bar.

To decrease the amount of taper, the adjustment shaft is turned to move the wedge blocks to the left, viewing FIGURE 11, whereby wedge block 126 causes the sine bar to swing in a clockwise direction, viewing FIGURE 11, and simultaneously moves wedge block 123 to permit pivoting of the sine bar.

Both rollers 122 and 125 engage their taper faces 124 and 127 respectively during travel of the two blocks toward or away from the end of the pipe when the blocks are moved in the slot to vary or adjust amounts of taper to be imparted to the pipe.

At each end of the cross slide way 100 and on the outside of the ways 4 and 5 is a bracket 103 (FIGURE 10) which mounts a motor cylinder 146 whose piston rod 147 connects it to the tool platens 105 and 106. The motor cylinder 146 exerts a force against the tool platen to insure that the taper tools and the chasers are maintained in working engagement with the end of the pipe for carrying out tapering and threading as the carriage travels on the ways towards the pipe receiver 3.

Two extension arms 148 of each tool platen support a sine bar roller 149 which depends from a plate 150 extending between the extension arms. The sine bar roller engages and travels along the taper side 116 of the sine bar as the carriage travels toward the pipe receiver 3, thereby determining the amount of taper produced on the end of the pipe. As the taper side inclines outwardly away from the ways in the direction of the pipe receiver 3, the sine bar roller traveling the tapered side causes the tool platen to move on the cross slide way 100 away from the pipe to produce the taper. Movement of the tool platen away from the pipe is resisted by the motor cylinder 146 which insures that the taper tools and chasers engage the pipe for the tapering and threading operation and simultaneously insures that the sine bar roller engages the taper side 116 of the sine bar.

The motor cylinder 146 also moves its tool platen into position for tapering and threading a pipe of a given diameter at the start of the operation, thereby bringing the sine bar roller into engagement with the taper side of the sine bar for travel therealong. Upon completion of the tapering and threading operation, the motor cylinder 146 withdraws the taper tool and chaser from the pipe and the sine bar roller from the sine bar by moving apart the tool platens on the way 100.

The sine bar and wedge blocks provide an excellent, rugged and sensitive control over the amounts of taper imparted to the pipe. Close taper specifications present no problem because the wedge blocks afford easy and accurate regulation of changes in amounts of taper from one pipe to another, and furthermore, adjustment of a plurality of chasers to produce a given taper is avoided.

Travel of the chasers while in engagement with and along the pipe during threading thereof is controlled by a thread pitch cam disk 151 (FIGURES 3 and 14) keyed to a driven shaft 152 journaled upon the frame 2. Rotation of the cam disk is related to revolutions of the barrel 11, thereby controlling thread pitch and assuring a uniform pitch in the threads. The drive shaft 14 which is driven by the motor 12 and which drives the barrel 11 through worm gearing 15 and 16 in turn drives a second shaft 153 through a worm gear reducer 154. The second shaft 153 then drives the shaft 152 which mounts the cam disk through a second worm gear reducer 155 and a clutch 156.

A cam follower 157 supported by the carriage 6 engages the cam disk 151 upon advancement of the carriage towards the pipe receiver. The carriage cylinder motor maintains the cam follower in engagement with the disk cam so that rate of feed of the chaser to the pipe is controlled by the cam disk 151 for regulation of thread pitch. On one threader the drive shaft 14 has a speed range of 180 to 720 r.p.m. whereas the shaft 152 has a speed range of .1 to .4 r.p.m.

Figure 14:
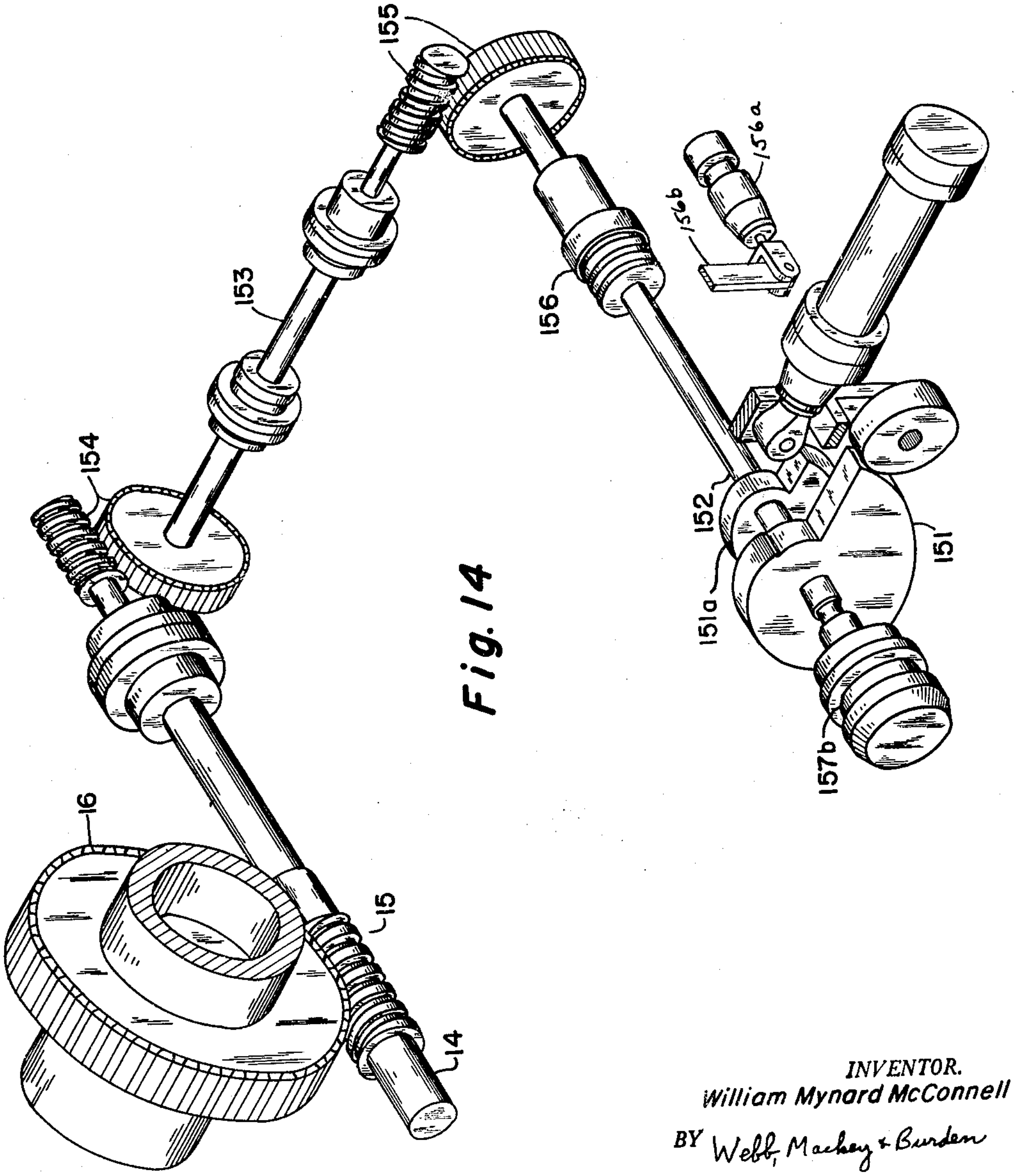
FIGURE 14 is an isometric view of the drive for the threader and of a cam control which regulates travel of the carriage of FIGURE 10.

A hydraulic motor 157*b* connected to the shaft returns the cam to its starting position shown in FIGURE 14 upon completion of tapering and threading and after disengagement of the clutch 156.

While FIGURES 3 and 14 show a single cam disk 151, a second cam disk 151*a* shown in dash lines can be mounted upon the shaft 152 with the disk 151 for API threads and the second disk for buttress or other threads. Then by mounting the cam follower 157 upon a slidable shaft 157*a*, either API threads or buttress threads can be easily made by shifting the slidable shaft to a position where the cam follower 157 engages either the disk for API threads or the disk for buttress threads.

As shown in FIGURE 15, the carriage 6 has a cam bracket 174 which mounts the first screw adjustable cam 170 and the second screw adjustable cam 172. Both screw adjustable cams travel with the carriage 6 over the ways 4 and 5 and each screw adjustable cam is adjustable to a given position on the cam bracket independent of the other screw adjustable cam. The first screw adjustable cam 170 is positioned on the bracket to engage a limit switch 171 attached to the frame 2 and the second screw adjustable cam 172 is located to engage a limit switch 173 also attached to the frame 2. Contact of limit switch 171 by screw cam 170 generates an electrical signal which functions through conventional circuits (not shown) to bring about operation of a cylinder motor 156*a* to move a lever 156*b* connected to the clutch 156. Movement of the lever 156*b* engages the clutch whereupon the cam disk begins to rotate.

Both screw adjustable cams 170 and 172 have a threaded shaft which extends through a threaded bore of a lug of the cam bracket. Thus, the screw cam 170 can be positioned longitudinally of the carriage to determine where it engages the limit switch 171 and the screw cam 172 also can be located to determine where it strikes limit switch 173 to terminate threading.

In the event the limit switch 173 fails to terminate threading or in the event something happens to the pipe in the receiver 3, forward movement of the carriage 6 towards the receiver 3 is interrupted by actuation of a limit switch 175 by the cam disk 151 (FIGURE 15). When limit switch 175 is actuated by the disk 151, the tool platens move away from the pipe and the carriage is returned to its starting position. The limit switch 175 is located so that its actuation occurs when the cam disk 151 has rotated beyond that position where the second screw adjustable cam normally actuates the limit switch 173 to terminate the threading operation.

Tapering and threading thin walled pipe such as pipe with walls ¼" or less in thickness preferably includes supporting interiorly the pipe walls at the end where tapering and threading occurs to avoid buckling or collapsing of the walls. Accordingly, as shown in FIGURE 3, I place an insert such as a plug 21*a* in the end of the pipe 21 before the pipe enters the receiver 3 or after its entry into the receiver. The plug has a wooden core and a rubber covering thereon and engages the inside walls of the pipe.

In operation of the pipe threader 1, tapering of the end of the pipe is completed or substantially completed before threading commences. The rate of advancement of the carriage 6 along the ways 4 and 5 during the tapering operation results from a metered feed of hydraulic fluid to the cylinder motor 98. When the cam follower engages the disk 151, the disk controls advancement of the carriage along the ways and thereby regulates the pitch of the threads imparted by the chasers. To insure that the cam follower 157 remains in engagement with the cam disk throughout the threading operation, feed of hydraulic fluid to the cylinder motor 98 increases upon actuation of the limit switch 171 by the first screw adjustable cam 170.

Tapering and threading an end of pipe on my pipe threading machine comprises delivery of a length of pipe to and into the pipe receiver by conventional table rolls (not shown). The pipe enters the pipe receiver through the primary chuck and the end to be tapered and threaded travels out through the steady rest chuck into engagement with the pipe stop and into lengthwise position for the tapering and threading operations. In the event the pipe is rotating upon engagement with the stop, the mounting of the stop permits it to revolve with the pipe. Next, the primary chuck rotating at a base speed closes and grips the pipe and thereafter the steady rest chuck also rotating at the base speed closes and engages the pipe, thereby centering and positioning axially the end of the pipe. After closing of the two chucks, the pipe stop rotates out of engagement with the end of the pipe and rate of rotation of the pipe receiver and the pipe advances to a predetermined rate for the tapering and threading operations. Next, the tool platens move the taper tools and chasers into position for tapering and threading the pipe and bring the sine bar rollers into engagement with the sine bar. Then, the carriage cylinder motor advances the carriage from its starting position towards the pipe receiver until the tapering tools engage the end of the pipe whereupon a metered feed of hydraulic fluid to the motor cylinder 98 regulates rate of travel of the carriage 6 along the ways for the tapering operation. As the tapering operation is completed, the cam follower engages the thread pitch cam disk which has commenced rotation upon engagement of the clutch. Thereafter, the rate of feed of the chasers to the pipe is regulated by rotation of the cam disk with the cam follower in engagement therewith as the motor cylinder 98 urges the carriage along the ways towards the pipe receiver. After completion of the tapering and threading operation, the tool platens separate; the carriage cylinder motor returns the carriage to its starting position; the clutch disengages; and the hydraulic motor returns the cam disk to its starting position.

My pipe threader has important advantages which render it highly valuable to pipe and tube manufacturers. In the first place, the threader is adapted to accommodate carbide chasers which produce excellent finish of the threads and which permit threading speeds up to 600 f.p.m. In addition, carbide chasers have a useful life three to five times that of high speed tool steel chasers and produce superior accuracy in the threads and the taper. Also, high speed tool steel chasers fail gradually whereas carbide chasers cut about 150 to 250 ends at about the same tolerance and then fail completely on the 251st end.

My pipe threader with a pair of carbide chasers attains accuracies of ±.0005 in the threads for 250 pipe ends per pair of chasers where conventional commercial tolerances in threading operations are ±.002" to ±.003".

In the second place, my threader permits use of stationary chasers particularly carbide ones as distinguished from rotating ones, thereby making possible dry cutting or threading with its greater ease of removal of chips from the machine. Dry cutting provides greater cutting speeds because it is almost impossible to deliver sufficient coolant to rotating carbide chasers when threading speeds exceed 350 f.p.m.

In the third place, the steady rest chuck holds the pipe on center and positioned axially adjacent the end which is threaded or tapered without rounding an ovalled end and without application of pressure, thereby insuring that the threads will be round even if the pipe is oval. Also, the steady rest chuck in combination with the primary chuck reduces and sometimes eliminates whipping of the end to be tapered and threaded of a cambered length of pipe.

In the fourth place, my invention produces uniform taper and uniform pitch of the threads with ability to quickly change the pitch of the threads by changing cams without requiring an alteration in the gear drive with accompanying down-time of the machine.

In the fifth place, my invention with its cam control feed for regulating thread pitch eliminates a lead screw heretofore used to control the pitch of the threads. Elimination of the lead screw avoids problems of compensated lead screws, particularly where high speed tool steel chasers are used. Since a high speed tool steel chaser fails gradually, lead screws are made with a fast lead screw cut of about 50% of allowable tolerance. Results in pipe threading from use of such compensated lead screws are the first third of the threaded ends has a plus tolerance of .002 to .003" or a fast lead. The second third of the threaded ends has about a perfect thread and the last third has a minus tolerance of .002 to .003" or a slow lead. Thus only a few pipe ends have threads which fall within a close tolerance range while the balance of the threads tolerancewise fall at one or the other limits of the tolerance range.

In the sixth place, my invention eliminates rotating heads which mount chasers for producing threads and tools for making taper by rotation of the pipe and by use of stationary chasers mounted upon a carriage traveling over the ways of the machine. Elimination of the rotating heads avoids problems of (1) providing a perpendicular face for the end of the pipe to be threaded; (2) accurate centering of the chasers relative to the longitudinal axis of the pipe; (3) threading a pipe that is oval; (4) dissipation of heat from the chasers and/or taper tools mounted within a rotating head; (5) down-time of about 20 to 40 minutes when changing a head compared to about 1 to 3 minutes down-time for changing chasers on my machine; and (6) large inventories in spare heads and chasers compared to a few chasers for my machine.

In the seventh place, my machine both tapers the end of the pipe and threads it, thereby eliminating a problem of accurately recentering the end of the pipe for the threading operation after the tapering operation has been completed. Heretofore, the tapering operation has been carried out on one machine and the threading operation on a second machine, thus requiring that the pipe be recentered in the second machine before start of the threading operation. If the pipe were not accurately recentered in the second machine, then the threads imparted thereto would be out of round and/or defective. Accurate recentering of the pipe in the second machine has been time-consuming and, in many instances, difficult. Accordingly, carrying out the tapering and threading operations on the same machine assures that the end of the pipe need be centered only once.

In the eighth place, my machine is especially adapted for automatic operation with high production and minimum adjustments for changes in pipe size, type and pitch of thread, amount of taper, etc.

While I have shown and described a preferred embodiment of my invention, it may be otherwise embodied within the scope of the following claims.

I claim:

1. A method of threading an end of a length of pipe comprising gripping the pipe at a place along its length spaced apart from the end to be threaded, centering and locating said end axially at a given position relative to a tool for threading said end by engaging and applying force radially to said pipe about its periphery adjacent the end to be threaded, said engaging and applying being closer to said end than said place where said pipe is gripped, said force being in an amount sufficient to center and locate said end but insufficient to round ovalled pipe and less than that force used to grip said pipe, after said centering and locating and while engaging, maintaining said end in said given position during threading without application of pressure thereto by effecting a lock upon said end through provision of a backing which prevents radial movement of the pipe out of said position, rotating said pipe about its longitudinal axis during said maintaining, during said rotating, feeding said threading tool, which is stationary, into engagement with said end to be threaded.

2. A method of tapering and threading an end of a length of pipe comprising gripping the pipe at a place along its length spaced apart from the end to be threaded, centering and locating said end axially at a given position relative to at least one of a tool for tapering and a tool for threading said end by engaging and applying force radially to said pipe about its periphery adjacent the end to be threaded, said engaging and applying being closer to said end than said place where said pipe is gripped, said force being in an amount sufficient to center and locate said end but insufficient to round ovalled pipe and less than that force used to grip said pipe, after said centering and locating and while engaging, maintaining said end in said given position during threading without application of pressure thereto by effecting a lock upon said end through provision of a backing which prevents radial movement of the pipe out of said position, rotating said pipe about its longitudinal axis during said maintaining, during said rotating, feeding said tapering tool, which is stationary, into engagement with said end and feeding said threading tool, which is stationary, into engagement with said end.

3. In a method of threading an end of a length of pipe wherein said pipe is gripped at a place along its length spaced apart from the end to be threaded, the invention comprising centering and locating said end axially at a given position relative to a tool for threading said end by engaging and applying force radially to said pipe about its periphery adjacent the end to be threaded, said engaging and applying being closer to said end than said place where said pipe is gripped, said force being in an amount sufficient to center and locate said end but insufficient to round ovalled pipe and less than that force used to grip said pipe, after said centering and locating and while engaging, maintaining said end in said given position during threading without application of pressure thereto by effecting a lock upon said end through provision of a backing which prevents radial movement of the pipe out of said position, rotating said pipe about its longitudinal axis during said maintaining, during said rotating, feeding said threading tool, which is stationary, into engagement with said end to be threaded.

4. In a method of threading and tapering an end of a length of pipe wherein said pipe is gripped at a place along its length spaced apart from the end to be threaded, the invention comprising centering and locating said end axially at a given position relative to at least one of a tool for tapering and a tool for threading said end by engaging and applying force radially to said pipe about its periphery adjacent the end to be threaded, said engaging and applying being closer to said end than said place where said pipe is gripped, said force being in an amount sufficient to center and locate said end but insufficient to round ovalled pipe and less than that force used to grip said pipe, after said centering and locating and while engaging, maintaining said end in said given position during threading without application of pressure thereto by effecting a lock upon said end through provision of a backing which prevents radial movement of the pipe out of said position, rotating said pipe about its longitudinal axis during said maintaining, during said rotating, feeding said tapering tool, which is stationary, into engagement with said end and feeding said threading tool, which is stationary, into engagement with said end.

References Cited in the file of this patent

UNITED STATES PATENTS

| | | |
|---|---|---|
| 1,124,692 | Boax | Jan. 12, 1915 |
| 1,304,906 | Richards | May 27, 1919 |
| 1,967,508 | Hubbard | July 24, 1934 |
| 1,978,427 | Hogg | Oct. 30, 1934 |
| 1,986,494 | Battaline | Jan. 1, 1935 |
| 2,006,621 | Berg | July 2, 1935 |
| 2,067,626 | Benninghoff | Jan. 12, 1937 |
| 2,246,237 | Benninghoff | June 17, 1941 |
| 2,349,159 | Freeman | May 16, 1944 |
| 2,578,221 | Bodmer | Dec. 11, 1951 |
| 2,616,103 | Stecher | Nov. 4, 1952 |
| 2,676,385 | Pulman | Apr. 27, 1954 |
| 2,679,057 | Sawdey | May 25, 1954 |
| 2,694,815 | Barnes | Nov. 23, 1954 |
| 2,768,393 | Sayce | Oct. 30, 1956 |